(No Model.)
S. R. BECKWITH.
ELECTRIC BATTERY AND APPLICATION THEREOF TO MEDICINAL PURPOSES.
No. 542,459. Patented July 9, 1895.
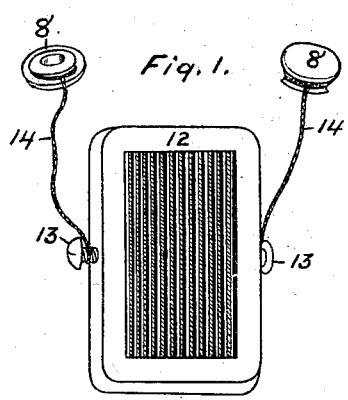
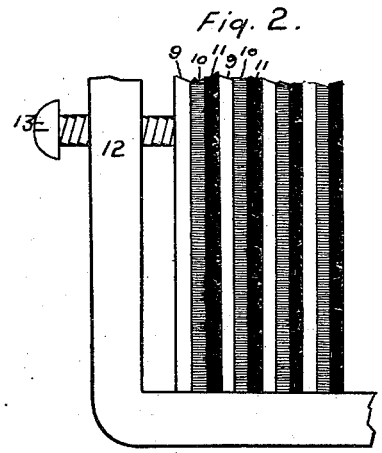
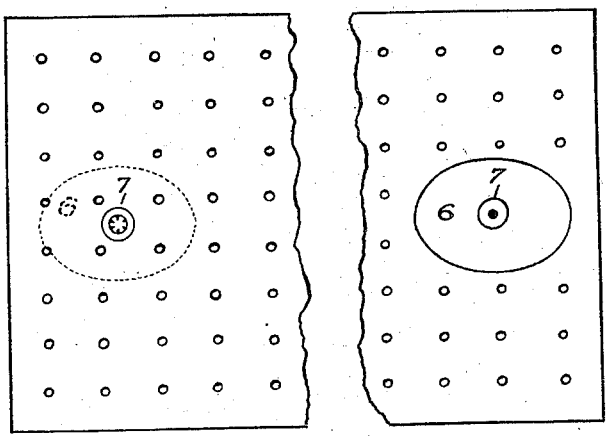
WITNESSES:
INVENTOR
Seth R. Beckwith
BY Gifford & Bull
ATTORNEYS.

UNITED STATES PATENT OFFICE.

SETH R. BECKWITH, OF ORANGE, NEW JERSEY.

ELECTRIC BATTERY AND APPLICATION THEREOF TO MEDICINAL PURPOSES.

SPECIFICATION forming part of Letters Patent No. 542,459, dated July 9, 1895.

Application filed April 3, 1895. Serial No. 544,368. (No model.)

*To all whom it may concern:*

Be it known that I, SETH R. BECKWITH, a citizen of the United States, and a resident of Orange, in the county of Essex and State of New Jersey, have invented certain new and useful Improvements in Electric Batteries and Their Application for Medicinal Purposes, of which the following is a specification.

My invention relates to electric batteries and their application for medicinal purposes; and it consists of certain parts and combinations of parts particularly pointed out in the claims concluding this specification.

In the accompanying drawings I have illustrated my invention in the forms at present preferred by me, but it will be understood that various modifications and changes may be made without departing from the spirit of my invention and without exceeding the scope of the concluding claims.

In the drawings, Figure 1 is a perspective of the battery with means for attaching it to a porous plaster. Fig. 2 is an enlarged view of a portion of said battery. Figs. 3 and 3ª are plan views of opposite sides of a porous plaster.

Similar figures of reference indicate the same or corresponding parts in all the figures of the drawings.

The drawings show an ordinary porous plaster to which are attached contact-plates on the adhesive side thereof and a generator of electricity removably attached to said contact-plates, so that an electric current may be, when desired, passed through and made to simultaneously treat the tissues acted upon by the plaster, or so that the poles of the battery may be by adhesion attached to and the current generated by the battery may be conveniently applied to any part of the body desired.

The following is a description of the device shown in the drawings:

The battery (see Figs. 1 and 2) consists of a series of plates 9, 10, and 11, assembled in the manner shown in Fig. 2. 9 represents a zinc plate, 10 a copper plate, and 11 a sheet of paper or other suitable insulating material permeable to electrolytic fluid and preferably of an absorbing nature—such as paper or cardboard.

In place of the copper and zinc plates other metals, which, when associated in the presence of an electrolytic fluid, generate a current of electricity, may be employed or even a thermopile might be substituted therefor. These plates are arranged, preferably, in the manner shown in Figs. 1 and 2, the zinc plate of one couple being in contact with or electrically connected to the copper plate of the adjoining couple, so that the several couples are connected up in series. Any required number of elements may be employed to obtain a current of the proper intensity or volume. The elements may, however, be associated in any manner preferred.

12 is a frame of insulating material—such, for example, as hard rubber, duranoid, or other suitable non-conducting substance. The last plates on the opposite sides are of different metals—for example, one of zinc and the other of copper—forming the positive and negative poles of the battery.

13 13 are binding-screws which penetrate the frame 12 and rest in contact with the outside plates.

The elements of the battery preferably correspond in shape and size with the length and width of the frame 12 and are held in position by the pressure of the screws 13 13, which lock these plates in the frame very much as types are locked in a form.

A battery so constructed or one of other suitable form is preferably arranged with means for removably attaching it to a plaster for the purpose of electrically acting upon the tissues, which are simultaneously subjected to the action of the plaster for medicinal purposes and for the purpose of adhesively attaching it to the body where desired.

8 8 are the female members of a glove-fastener and 7 7 are the male members attached to the fastener, (see Figs. 1, 3, and 3ª,) furnishing a convenient means of readily attaching or detaching the battery. Any other suitable means adapted to accomplish substantially the same result might be substituted for those shown. As shown in Figs. 3 and 3ª, the male members are electrically connected with contact-plates 6 6, attached to the adhesive side of the plaster by rivets uniting said contact-plates and the male glove-fastener members 7. Thus the current generated in the battery is conveyed to the contact-plates 6 6 and passes through the tissues intervening between said plates. These contact-plates are preferably made of aluminium, although they might be made of any other suitable conducting material, but preferably of one not quickly oxidized or corroded under the conditions of use.

The battery is brought into operation by immersing it for a suitable time in an electrolytic fluid—such, for example, as dilute sulphuric acid. The insulating-strips 11 absorb the electrolytic fluid and the battery will continue to generate a current for a considerable length of time after it is removed from the bath or until the electrolytic fluid absorbed by the strips 11 has entirely evaporated.

The plaster shown is porous, but, if preferred, a non-porous plaster might be used. In the majority of cases I prefer to employ a medicated plaster, in which case the current will, I have discovered, carry the drugs present into the tissues much more rapidly than they would be under ordinary conditions absorbed thereby, but a non-medicated plaster in some cases is preferred. Instead of the plaster being of the ordinary form and applied to the ordinary medicinal uses, it, or parts of it, may be used for the purpose of adhesively attaching the poles of the battery in a convenient manner to the parts of the patient desired without functioning as a medicinal plaster.

In the foregoing specification I have referred to a few of the modifications which may be employed in the practice of my invention; but it is to be understood that mention by me of a few modifications is not intended to exclude others not referred to, but which are within the spirit and scope of my invention. In the concluding claims the omission of an element or the omission of reference to the detail features of the elements mentioned is intended to be a formal declaration of the fact that the omitted elements or features are not essential to the inventions therein severally covered.

What I claim is—

1. An electric battery consisting of a frame open at the sides and a plurality of battery elements composed of metallic plates, in width equal to the thickness of said frame laid lengthwise therein so as to be entirely surrounded thereby or locked together and held in position by friction.

2. The combination with a plaster of metallic contacts attached thereto and an electric battery removably attached to said contacts.

SETH R. BECKWITH.

Witnesses:
J. EDGAR BELL,
FRANCIS BROADNAX.